United States Patent
Wackerly (10) Patent No.: US 10,554,563 B2
(45) Date of Patent: Feb. 4, 2020

(54) GENERATING A PACKET PROCESSING PIPELINE DEFINITION

(71) Applicant: HEWLETT PACKARD ENTERPRISE DEVELOPMENT LP, Houston, TX (US)

(72) Inventor: Shaun Wackerly, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 232 days.

(21) Appl. No.: 15/221,899

(22) Filed: Jul. 28, 2016

(65) Prior Publication Data

US 2018/0034737 A1    Feb. 1, 2018

(51) Int. Cl.
*H04L 12/851* (2013.01)
*H04L 12/833* (2013.01)
*H04L 12/891* (2013.01)

(52) U.S. Cl.
CPC ...... *H04L 47/2441* (2013.01); *H04L 47/2458* (2013.01)

(58) Field of Classification Search
CPC .. H04L 47/2441; H04L 47/2458; H04L 47/41
See application file for complete search history.

(56) References Cited

U.S. PATENT DOCUMENTS

| 2015/0063112 A1* | 3/2015 | Wu | H04L 45/302 |
| | | | 370/235 |
| 2016/0065422 A1* | 3/2016 | Khargharia | H04L 45/30 |
| | | | 370/412 |

* cited by examiner

*Primary Examiner* — Gbemileke J Onamuti
(74) *Attorney, Agent, or Firm* — Park, Vaughan, Fleming & Dowler LLP (57) ABSTRACT

Example implementations relate to generating a packet processing pipeline definition. According to an example, an SDN controller includes a flow class module to receive flow class registrations specifying flow classes. The flow classes specify characteristics of expected network flows. The controller also includes a pipeline generating module to generate a packet processing pipeline definition to accommodate the expected network flows, the packet processing pipeline definition including table definitions for the flow classes. The SDN controller further includes a communication interface to send the packet processing pipeline definition to a switch.

20 Claims, 4 Drawing Sheets

GENERATING A PACKET PROCESSING PIPELINE DEFINITION

BACKGROUND

A switch pipeline includes a set of tables that are used by the switch to determine proper forwarding behavior to apply to packets in a network flow. These tables can be in the form of tertiary content addressable memory, hash tables, and index tables, and are implemented by hardware resources of the switch.

DETAILED DESCRIPTION

A switch's packet processing pipeline includes a set of tables that are used by the switch to determine proper forwarding behavior to apply to packets in a network flow. These tables can be in the form of tertiary content addressable memory, hash tables, and index tables, and are implemented by hardware resources of the switch.

Often the tables in a switch's packet processing pipeline are not allocated in an efficient manner because the pipeline is configured generically to accommodate a wide variety of traffic. For example, some switches have fixed packet processing pipelines that are not able to change. The packet processing pipelines in these switches are preconfigured in a generic manner so as to be suitable for a wide variety of switching environments. Recently, however, some switches have begun to support pipeline customization.

In switches that support pipeline customization, the hardware resources of the switch (e.g., an application specific integrated circuit (ASIC) having multiple table resources) can be divided into logical tables to accommodate various forwarding requirements. For instance, a tertiary content addressable memory (TCAM) block on a switch's ASIC may be configured as a large table to perform simple matching or alternatively as a smaller table to perform more complex matching. Pipeline customization can be enabled using software defined networking (SDN) techniques. An example SDN protocol for implementing SDN techniques is the OpenFlow protocol.

According to examples described herein, flow classes may be used to generate a packet processing pipeline definition, which can then be used to configure a packet processing pipeline of a switch that supports pipeline customization. Flow classes are used to describe a network flow abstractly, by specifying certain characteristics of the flow. A network flow is a series of data packets related to the same workload (e.g., a video communication session) sent from a source device to a destination device. A purpose of flow classes is to notify a network controller that actual flows having the characteristics specified in the flow class are expected to be sent through the network. With this advance knowledge, the network controller can then take some action to prepare the network for the expected flows. Flow classes may be registered with an SDN controller by SDN applications running in the network. The SDN applications can register the flow classes because the SDN applications are aware of the types of flows that they expect to inject into the network. Thus, using flow classes, an SDN controller may leverage the knowledge of SDN applications to prepare the network for expected flows.

An example method employing these techniques may be performed by an SDN controller to generate a packet processing pipeline definition using flow classes. The method includes receiving multiple flow class registrations from SDN applications, each flow class registration specifying a flow class including a priority, match fields, and instructions. The method further includes generating a packet processing pipeline definition for a switch by iterating through the flow classes and generating table definitions for the flow classes using the priority, match fields, and instructions. The table definitions are prioritized within the packet processing pipeline definition according to the priority of the respective flow class. The method then sends the packet processing pipeline definition to a controlled switch. The controlled switch may construct a packet processing pipeline in accordance with the packet processing pipeline definition using hardware resources of the controlled switch.

An example SDN controller employing these techniques includes a flow class module to receive flow class registrations specifying flow classes, the flow classes specifying characteristics of expected network flows. The controller also includes a pipeline generating module to generate a packet processing pipeline definition to accommodate the expected network flows, the packet processing pipeline definition comprising table definitions for the flow classes. The SDN controller uses a communication interface to send the packet processing pipeline definition to a switch. The switch may construct a packet processing pipeline in accordance with the packet processing pipeline definition using hardware resources of the switch. Details of this example method and controller will be described more fully in the description below.

Figure 1A:
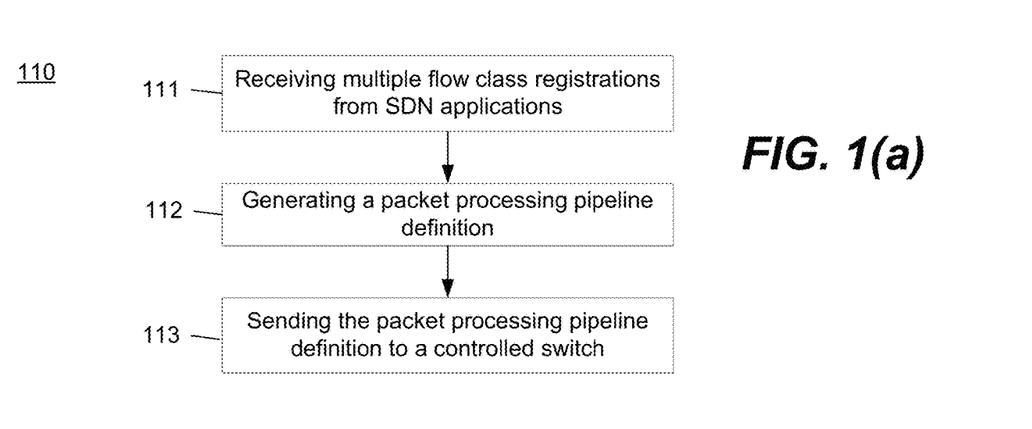
FIG. 1(a) illustrates a flow chart of an example method for generating a packet processing pipeline definition, according to an example.
Figure 1B:
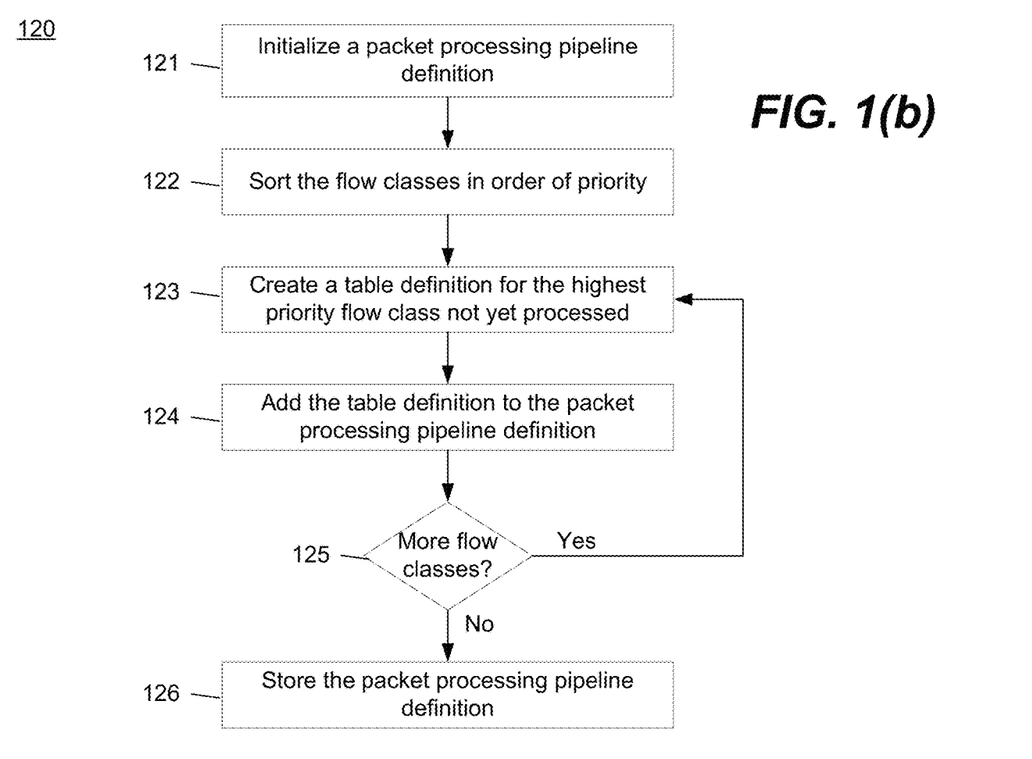
FIG. 1(b) illustrates a flow chart of an example method for generating a packet processing pipeline definition, according to an example.
Figure 1C:
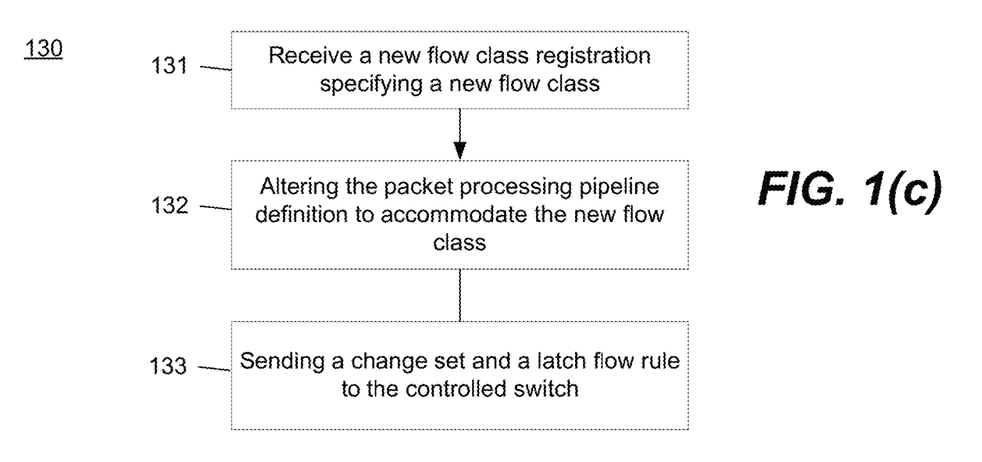
FIG. 1(c) illustrates a flow chart of an example method for altering a packet processing pipeline definition to accommodate a new flow class, according to an example.

FIGS. 1(a)-(c) illustrate methods for generating a packet processing pipeline definition, according to an example. Methods 110, 120, 130 may be performed by a computing device, computer, server, or the like, such as SDN controller 210 or computer 310. Computer-readable instructions for implementing methods 110, 120, 130 may be stored on a computer readable storage medium. These instructions as stored on the medium are referred to herein as "modules" and may be executed by a computer.

Methods 110, 120, 130 will be described here relative to environment 200 of FIG. 2. Environment 200 may include SDN controller 210 and one or more switches 220. SDN controller 210 may be a computer configured to manage the control plane of a software defined network. SDN controller 210 may include/be implemented by one or multiple computers. Switch 220 may be a network infrastructure device, such as a layer 2 switch, layer 2/3 switch, or layer 3 router, of the software defined network. The switch 220 may thus be part of the data plane of the software defined network, which may include multiple network devices.

SDN controller 210 may communicate with switch 220 via an SDN protocol, such as the OpenFlow protocol. SDN controller 210 may program rules in flow tables of switch 220. Switch 220 may use these rules to process and forward network traffic. The flow tables may be implemented by multiple table resources (e.g., Tertiary Content Addressable Memory (TCAM), hash tables, index tables, counters, etc.) within switch 220, and each flow table may include multiple tables. Additionally, a variety of SDN applications may run on or interface with SDN controller 210. These SDN applications may be part of the application plane of the software defined network.

SDN controller 210 and switch 220 may include one or more processing resources and one or more machine-readable storage media. A processing resource may include one or more central processing unit (CPU), one or more semiconductor-based microprocessor, one or more digital signal processor (DSP) such as a digital image processing unit, other hardware devices or processing elements suitable to retrieve and execute instructions stored in memory, or combinations thereof. The processing resource can include single or multiple cores on a chip, multiple cores across multiple chips, multiple cores across multiple devices, or combinations thereof. The processing resource may fetch, decode, and execute instructions from memory to perform various functions. As an alternative or in addition to retrieving and executing instructions, the processing resource may include one or more integrated circuit (IC), including an application specific integrated circuit (ASIC), a content addressable memory (CAM) or ternary content addressable memory (TCAM), other control logic, other electronic circuits, or combinations thereof that include a number of electronic components for performing various tasks or functions.

The processing resource may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, SDN controller 210 and switch 220 may include one or more machine-readable storage media separate from the one or more processing resources, as well as additional hardware elements, such as TCAMs and ASICs.

Turning to FIG. 1(*a*), method 110 may be used by SDN controller 210 to generate a packet processing pipeline definition for switch 220, according to an example. At 111, SDN controller 210 may receive multiple flow class registrations from SDN applications.

The SDN applications may be network applications that interface run on or interface with SDN controller. An example SDN application is a traffic management application dedicated to a particular user application, such as an application for managing traffic from video conferencing application instances running on user computers. The SDN applications may be aware of typical characteristics of network flows that are injected onto the network via the SDN application. For example, the SDN application may know which field values (e.g., header fields) of the network flow may be matched to recognize the network flow and may also know an expected number of network flows that may be injected onto the network. For instance, if the SDN application is an application to manage traffic generated by a video conference application, the SDN application may know how many users of the video conferencing application are connected to the network, and thus may know a maximum number of network flows that may be created.

Leveraging this knowledge of the SDN applications, the SDN applications may notify the SDN controller 210 of expected network flows so that the SDN controller 210 can prepare the network for the network flows. SDN applications may notify the SDN controller 210 of the expected network flows through flow classes. Flow classes are used to describe a network flow abstractly, by specifying certain characteristics of the flow. A network flow is a series of data packets related to the same workload (e.g., a video communication session) sent from a source device to a destination device.

A flow class can include various information. FIG. 2(*b*) depicts an example flow class registration 251 with a priority 252, match fields 253, instructions 254, and scale 255. The priority 252 specifies the priority that network flows matching the flow class should be accorded. The priority 252 may allow the SDN controller 210 to compare the priority of one flow class to the priority of another flow class. Match fields 253 specify fields for identifying network flows that match the flow class. Example match fields are IP source address, IP destination address, Ethernet source address, Ethernet destination address, and Ethernet type. Instructions 254 specify what action(s) the network switch should take for a matching network flow. Example instructions are Forward (e.g., forward the packet to a particular next hop device), Drop (e.g., discard the packet), and Steal (e.g., send the packet to the SDN controller 210). Scale 255 represents a scale parameter that specifies a magnitude of expected network flows matching the flow class. The scale can be in the form of a maximum number or range of flows that may be expected for the flow class, for example. The scale value indicates how big a table in a switch's packet processing pipeline needs to be in order to accommodate the number of flows that may be received for the flow class.

The SDN applications may register flow classes with the SDN controller 210 by sending flow class registrations 201 to the SDN controller 210 via the control plane of the network. The flow class registrations 201 can include the above information for a given flow class. The SDN controller 210 can receive and process the flow class registrations 201 using the flow class module 212.

At 112, the SDN controller 210 can generate a packet processing pipeline definition using pipeline module 214. Switch 220 may include hardware resources for implementing TCAMs, hash tables, and index tables. These resources may make up the packet processing pipeline of the switch. Thus, a packet processing pipeline is a set of table resources configured to match network packets received by the switch to forwarding rules. The switch may then forward the network packet according to a matched forwarding rule. In an SDN-enabled switch, the forwarding rules may be implemented as flow rules stored in one or more flow tables. The flow tables are implemented using the table resources of the switch.

Flow tables can be configured in various manners to match against different types of traffic (e.g., data center network traffic may be different from traffic on a campus network) and to take different types of actions with respect to matched traffic. Furthermore, the complexity of the flow table may vary. For example, a TCAM block on a switch's ASIC may be configured as a large table to perform simple matching or alternatively as a smaller table to perform more complex matching. However, the packet processing pipeline (i.e., table resources) of the switch has to be configured in certain ways in order to support different types of flow tables. In some switches, the packet processing pipeline is fixed and cannot be altered after the switch has been deployed in a network. Some switches, though, support pipeline customization. In switches that support pipeline customization, the configuration of the packet processing pipeline may be specified by loading a default configuration or by receiving a pipeline definition from another source, such as from a network management device. In this example, switch 220 is an SDN-enabled switch that supports pipeline customization.

Figures 2A, 2B:
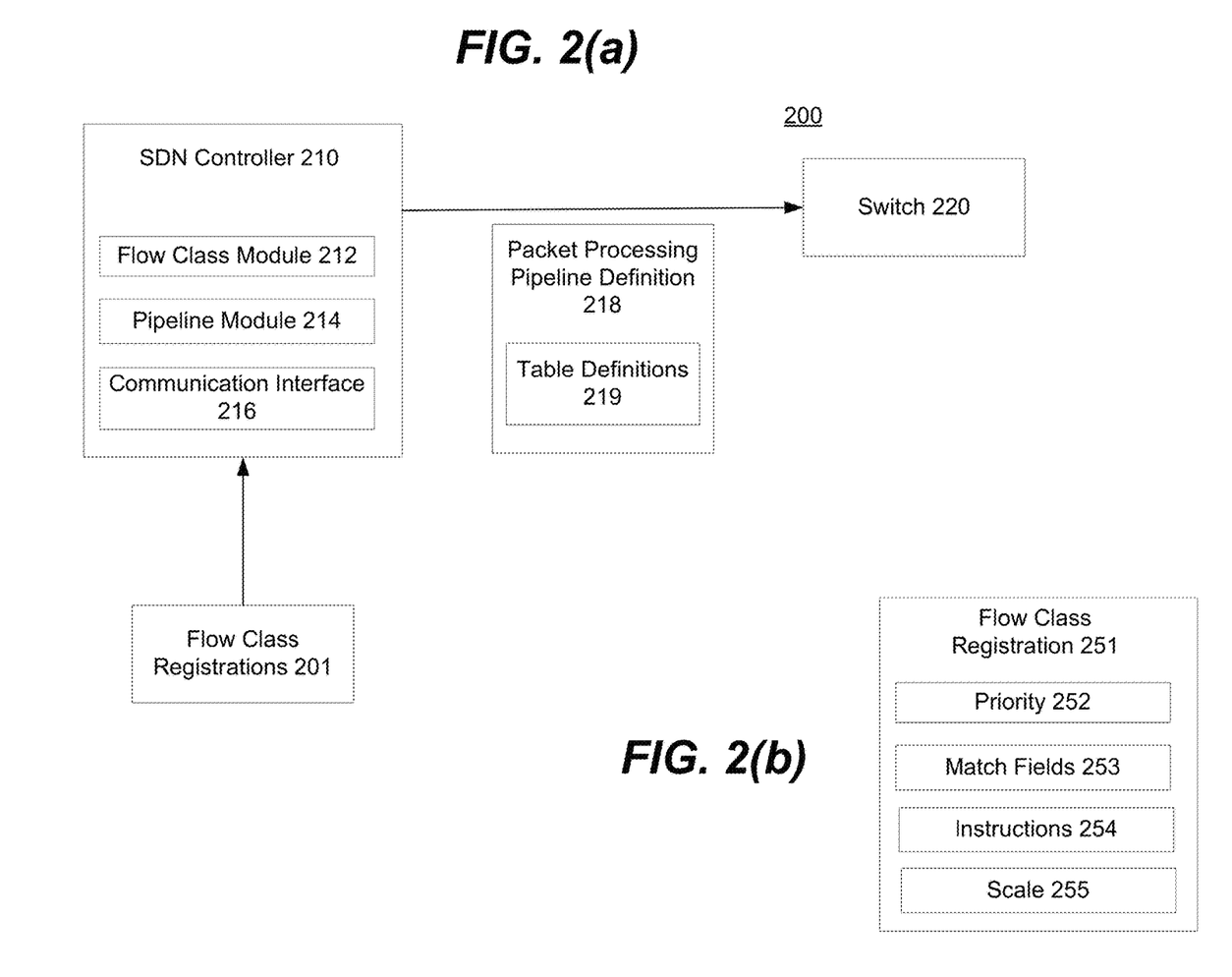
FIG. 2(a) illustrates an example environment with an SDN controller configured to generate a packet processing pipeline definition for a switch, according to an example.
FIG. 2(b) illustrates an example flow class registration, according to an example.

SDN controller 210 may perform method 120 of FIG. 2 to generate a packet processing pipeline definition 218 for switch 220. The pipeline definition 218 may include a number of table definitions 219 that indicate how the table resources of switch 220 should be configured so that switch 220's packet processing pipeline can support the appropriate flow tables for processing network flows expected in the network. Method 120 will now be described to illustrate how pipeline module 214 may generate the packet processing pipeline.

At 121, SDN controller 210 may initialize a packet processing pipeline definition. The packet processing pipeline definition 218 may be a data structure stored in memory that represents how table resources of switch 220 should be configured. The packet processing pipeline definition 218 may include multiple table definitions 219. A table definition may be a data structure stored in memory and may specify how a table should be configured in the packet processing pipeline. The table definition may include the priority 252, match fields 253, instructions 254, and scale 255 of a respective flow class. A switch may thus allocate some of its table resources to construct a table in accordance with the table definition. By processing all table definitions in a packet processing pipeline definition, a switch can construct its packet processing pipeline. In some examples, if a packet processing pipeline definition does not result in the allocation of all of the table resources of a switch, the switch may leave the remaining table resources unallocated so that they are available for later use. In another example, the switch can allocate the remaining table resources according to a default table allocation scheme.

At 122, SDN controller 210 may sort the registered flow classes in order of priority. One reason for sorting the flow classes is to order the table definitions 219 within the pipeline definition in order of priority. Thus, when switch 220 is constructing its packet processing pipeline according to the pipeline definition 218, it can organize the tables in order of priority. Another reason for sorting the flow classes by priority may be to enable differentiated treatment of the flow classes based on priority. For example, the table definitions 219 may require more table resources than are available in switch 220. By sorting the flow classes in order, the SDN controller 210 may specify the table definitions in such a way that higher priority flow classes have their requests fully satisfied while lower priority flow classes are not fully satisfied.

At 123, SDN controller 210 may create a table definition for the highest priority flow class not yet processed. The table definition may be created by adding the match fields, instructions, and scale of the flow class being processed to the table definition. At 124, the SDN controller 210 may add the table definition to the packet processing pipeline definition. At 125, SDN controller 210 may determine whether all flow classes have been processed. If no, method 120 returns to block 123 and processes the next highest priority flow class. If yes, method 120 proceeds to block 126, where the packet processing pipeline definition is stored for later use.

In some examples, the SDN controller 210 can determine whether a scale specified by a flow class registration is too big to be accommodated by the table resources of switch 220. For instance, pipeline module 214 can keep track of how many table resources have been allocated so far in the creation of the packet processing pipeline definition and can thus determine if the scale of the current flow class would exceed the number of resources available in switch 220 (which SDN controller 210 would know since it controls switch 220). If the scale is too big for switch 220, SDN controller 210 can reject the flow class registration for the current flow class and can notify the SDN application that registered it that the scale could not be accommodated.

In another example, if the scale is specified as a range, the table definition can be created but the scale parameter can be left blank, and the table definition can be flagged for later scale processing. Then, after all flow classes have been iterated through (e.g., at block 126), the table definitions flagged for later scale processing can be iterated through and a scale within the specified range of the respective flow class can be selected for the each table definition.

In another example, the scale for each flow class may be normalized to ensure that the table definitions fit within the available table resources of a switch. For instance, for each flow class, the number of resources requested by a flow class may be calculated based on the flow class characteristics including the specified scale. A total number of requested resources may be calculated by adding up the calculated requested resources of each flow class. A normalization factor may then be calculated by dividing a number of available table resources of the switch by the total number of requested resources. Then, a normalized scale of each flow class may be calculated by multiplying the flow class' requested number of resources by the normalization factor. The normalized scale may be used to create the table definitions for each flow class.

In some examples, at block 123, before a new table definition is created for a flow class, any previously created table definitions can be iterated through to determine whether any of them can be altered to accommodate the current flow class. For instance, because there are a finite set of fields that can be matched and a finite set of actions that can be applied to a packet, some flow classes may define network flows that, for purposes of processing by a switch, can be handled by the same flow tables within the switch. In such a case, the table definition can be altered (e.g., resized) to accommodate the current flow class instead of creating a new table definition. By resizing a current table definition rather than creating a new table definition, when the table definitions are implemented in the packet processing pipeline of a switch (as will be described later), table resources of the switch may be conserved.

For example, flow classes that specify the same match fields but different instructions may be able to be implemented using the same table definition. For instance, both flow classes may specify matching on the IPv4 source address, but the instruction for one is to block a matching flow while the instruction for the other is to apply certain quality of service actions to a matching flow. A single table definition could be generated that matches IPv4 source address and permits either action depending on which entry a flow is matched to (based on the flow's IPv4 source address).

As another example, flow classes that specify the same instructions but specify match fields that differ by some value 'N' fields may potentially be implemented by the same table definition. For instance, two flow classes may specify an instruction to forward the packet to a device for inspection of matching flows, but the flow classes specify slightly different matching fields (e.g., one's match fields are Ethernet type, Ethernet source address, and Ethernet destination address, while the other's match fields are Ethernet type, IPv4 source address, and IPv4 destination address. A single table definition could be created that matches on all match fields specified by either field (i.e., Ethernet type, Ethernet source address, Ethernet destination address, IPv4 source address, and IPv4 destination address) and includes the specified instruction.

Returning to FIG. 1(a), method 110 continues at 113, where SDN controller 210 sends the stored packet processing pipeline definition 218 to a controlled switch, such as switch 220, via the communication interface 216. The switch 220 then constructs a packet processing pipeline based on the definition. For example, switch 220 can iterate through the table definitions 219 and allocate table resources to construct flow tables in accordance with the table definitions. The flow tables may be created in accordance with an SDN protocol, such as OpenFlow. The packet processing pipeline can be constructed so that the higher priority flow tables appear first in the pipeline. This will ensure that switch 220 attempts to match a received packet to these higher priority flow tables first before attempting to match to a lower priority table.

SDN controller 210 can then send flow rules to switch 220 to populate the flow tables in the packet processing pipeline. Switch 220 may add the flow rules to the tables, in accordance with an SDN protocol. Because the packet processing pipeline was constructed based on information from flow classes, the pipeline may be allocated in a more efficient manner for accommodating the various flow rules that are pushed to switch 220. As a result, switch 220 may process network traffic more effectively, thus improving the performance of the network. Additionally, switch 220 may have additional resources leftover that can be allocated as necessary, whereas if the processing pipeline had been a default, generic pipeline, such resources may not have been available for allocation.

FIG. 1(c) depicts a method 130 in which SDN controller 210 receives a new flow class registration from an SDN application relating to new network flows expected to be injected into the network, according to an example. At 131, SDN controller 210 may receive a new flow class registration specifying a new flow class. At 132, SDN controller 210 may alter the stored packet processing pipeline definition to accommodate the new flow class by adding a new table definition or by altering an existing table definition to accommodate the new flow class. At 133, SDN controller 210 may then send a change set to switch 220 representing the changes to be made to the existing packet processing pipeline definition to accommodate the new flow class, as well as a latch flow rule as described below. Switch 220 may then modify its packet processing pipeline to make the changes specified by the change set. If a new table is to be allocated, switch 220 can use any unallocated table resources to try to construct the new flow table. If there are not sufficient unallocated table resources, switch 220 can resize existing flow tables to free up table resources to add the new flow table. Such resizing of existing flow tables may be specified in the change set. If an existing table is to be altered, switch 220 may alter the table as specified by the change set.

In order to minimize data plane outages while changes are being made to an existing packet processing pipeline, SDN controller 210 may instruct switch 220 to install a latch flow rule as the first, highest priority entry in a flow table that is being altered. A latch flow is a mechanism to ensure that any traffic that switch 220 attempts to match to the table is handled in a pre-specified manner, instead of being matched to a table entry that may be incomplete (since the flow table is in the process of being altered). The latch flow may be given the highest priority so that it is the first flow table entry that a match is attempted on. The latch flow may also match to all values of match fields relevant to the flow table to guarantee that a packet is matched to the entry. The instructions or actions for the latch flow may specify any desired behavior for handling the packet. For example, the latch flow may specify that a matching packet should be stolen (i.e., sent) to the SDN controller 210. In another example, if switch 220 is a hybrid SDN switch having both an SDN portion of the packet processing pipeline and a non-SDN portion of the pipeline, the latch flow may specify that a matching packet should be sent to the non-SDN portion of the pipeline for processing. After the changes to the packet processing pipeline are finished, the latch flow rule can be removed to allow the packet processing pipeline to process packets normally.

Figure 3:
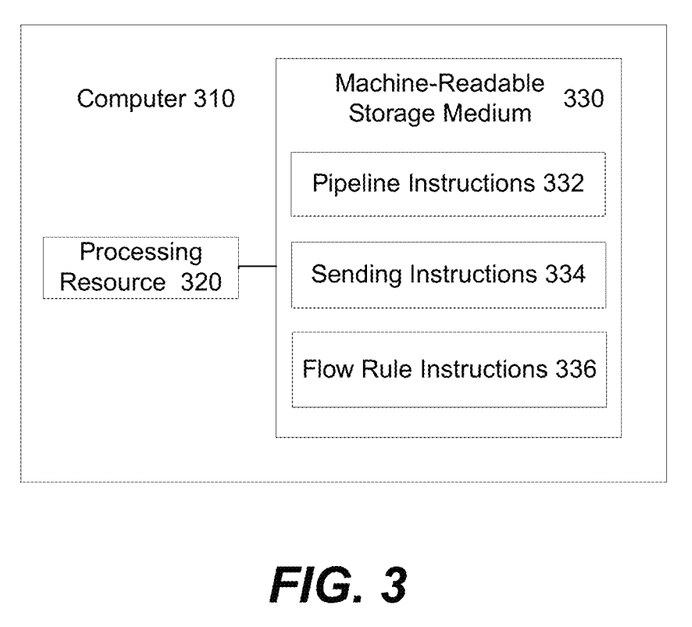
FIG. 3 illustrates an example machine-readable storage medium storing instructions for generating a packet processing pipeline definition, according to an example.

FIG. 3 illustrates a computer to generate a packet processing pipeline definition, according to an example. Computer 310 may be part of SDN controller 210. The computer may include one or more processing resources and one or more machine-readable storage media, as described with respect to SDN controller 210, for example.

Processing resource 320 may be at least one central processing unit (CPU), at least one semiconductor-based microprocessor, other hardware devices or processing elements suitable to retrieve and execute instructions stored in machine-readable storage medium 330, or combinations thereof. Processing resource 320 can include single or multiple cores on a chip, multiple cores across multiple chips, multiple cores across multiple devices, or combinations thereof. Processing resource 320 may fetch, decode, and execute instructions 332-336 among others, to implement various processing. As an alternative or in addition to retrieving and executing instructions, processing resource 320 may include at least one integrated circuit (IC), other control logic, other electronic circuits, or combinations thereof that include a number of electronic components for performing the functionality of instructions 332-336. Accordingly, processing resource 320 may be implemented across multiple processing units, and instructions 332-336 may be implemented by different processing units in different areas of computer 310.

Machine-readable storage medium 330 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 330 can be computer-readable and non-transitory. Machine-readable storage medium 330 may be encoded with a series of executable instructions for managing processing elements.

The instructions 332-336 when executed by processing resource 320 can cause processing resource 320 to perform processes, for example, methods 110, 120, 130, and/or variations and portions thereof. Instructions 332-336 will now be briefly described, which description should be read in light of the description of methods 110, 120, 130 and environment 200 above.

In an example implementation, computer 310 may generate a packet processing pipeline definition. For example, pipeline instructions 332 may cause processing resource 320 to generate a packet processing pipeline definition for a switch (e.g., switch 220) by iterating through flow classes and generating table definitions for the flow classes using a priority, match fields, and instructions within the flow classes. The table definitions are prioritized within the packet processing pipeline definition according to the priority of the respective flow class. Sending instructions 334 may cause processing resource 320 to send the packet processing pipeline definition to the switch to enable the switch to construct a packet processing pipeline in accordance with the packet processing pipeline definition using hardware resources of the switch. Flow rule instructions 336 may cause processing resource 320 to send flow rules to the switch relating to actual network flows to enable the switch to install the flow rules in the constructed packet processing pipeline.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the systems and methods of the present disclosure, this specification merely sets forth some of the many possible embodiments, configurations, and implementations. Furthermore, numerous details are set forth to provide an understanding of the system, method, and techniques of the disclosure. However, it will be understood by those skilled in the art that the system, method, and techniques may be practiced without these details. While the system, method, and techniques have been disclosed with respect to a limited number of embodiments, those skilled in the art will appreciate numerous modifications and variations therefrom. It is intended that the appended claims cover such modifications and variations.

What is claimed is:

1. A method performed by a switch in a network, the method comprising:
   receiving pipeline definition comprising a set of table definitions, wherein a respective table definition corresponds to a flow class using of a set of flow classes in the network and includes a priority, match fields, a scale parameter, and forwarding instructions of the flow class;
   determining, for a respective flow class, a set of tables facilitating forwarding operations for packets in the flow class based on the table definition of the flow class, wherein a size of a respective table in the set of tables is determined based on the scale parameter, which specifies a magnitude of flows associated with the flow class; and
   determining a packet processing pipeline for the switch by combining the set of tables of a respective flow class, wherein the packet processing pipeline prioritizes packet processing according to the priority of the flow class.

2. The method of claim 1, wherein the pipeline definition excludes a table definition of a flow class with a magnitude of flows greater than the switch's capability.

3. The method of claim 1, wherein determining the packet processing pipeline for the switch comprises allocating hardware resources of the switch for the packet processing pipeline in accordance with the pipeline definition.

4. The method of claim 1, further comprising receiving a flow rule associated with network flow and installing the flow rule in the packet processing pipeline.

5. The method of claim 4, wherein the network flow matches one of the set of flow classes.

6. The method of claim 1, wherein the pipeline definition comprises a table definition generated by altering a previously generated table definition to accommodate a flow class associated with the table definition.

7. The method of claim 1, further comprising:
   receiving a change set representing changes to be made to the packet processing pipeline to accommodate a new flow class.

8. The method of claim 7, further comprising:
   receiving a latch flow rule with the change set, wherein the latch flow rule is associated with a highest priority value of the packet processing pipeline; and
   installing the latch flow rule in a portion of the packet processing pipeline to control forwarding behavior while the portion of the packet processing pipeline is updated in accordance with the change set.

9. The method of claim 1, wherein the scale parameter for a respective flow class is normalized based on available table resources of the switch.

10. The method of claim 1, wherein the network is a software-defined network (SDN), and wherein the switch receives the pipeline definition based on an SDN protocol.

11. A non-transitory computer-readable storage medium storing instructions that when executed by a processing resource of a switch in a network to perform a method, the method comprising:
    receiving a pipeline definition comprising a set of table definitions, wherein a respective table definition corresponds to a flow class of a set of flow classes in the network and includes a priority, match fields, a scale parameter, and forwarding instructions of the flow class;
    determining, for a respective flow class, a set of tables facilitating forwarding operations for packets in the flow class based on the table definition of the flow class, wherein a size of a respective table in the set of tables is determined based on the scale parameter, which specifies a magnitude of flows associated with the flow class; and determining a packet processing pipeline for the switch by combining the set of tables of a respective flow class, wherein the packet processing pipeline prioritizes packet processing according to the priority of the flow class.

12. The non-transitory computer-readable storage medium of claim 11, wherein the pipeline definition excludes a table definition of a flow class with a magnitude of flows greater than the switch's capability.

13. The non-transitory computer-readable storage medium of claim 11, wherein determining the packet processing pipeline for the switch comprises allocating hardware resources of the switch for the packet processing pipeline in accordance with the pipeline definition.

14. The non-transitory computer-readable storage medium of claim 11, wherein the method further comprises receiving a flow rule associated with network flow and installing the flow rule in the packet processing pipeline.

15. The non-transitory computer-readable storage medium of claim 14, wherein the network flow matches one of the set of flow classes.

16. The non-transitory computer-readable storage medium of claim 11, wherein the pipeline definition comprises a table definition generated by altering a previously generated table definition to accommodate a flow class associated with the table definition.

17. The non-transitory computer-readable storage medium of claim 11, wherein the method further comprises:
receiving a change set representing changes to be made to the packet processing pipeline to accommodate a new flow class.

18. The non-transitory computer-readable storage medium of claim 17, wherein the method further comprises:
receiving a latch flow rule with the change set, wherein the latch flow rule is associated with a highest priority value of the packet processing pipeline; and
installing the latch flow rule in a portion of the packet processing pipeline to control forwarding behavior while the portion of the packet processing pipeline is updated in accordance with the change set.

19. The non-transitory computer-readable storage medium of claim 11, wherein the scale parameter for a respective flow class is normalized based on available table resources of the switch.

20. The non-transitory computer-readable storage medium of claim 11, wherein the network is a software-defined network (SDN), and wherein the switch receives the pipeline definition based on an SDN protocol.

* * * * *